United States Patent [19]
Sasamoto et al.

[11] Patent Number: 5,191,707
[45] Date of Patent: Mar. 9, 1993

[54] WORKING LINE FOR REAR FLOOR OF VEHICLE

[75] Inventors: Hiroshi Sasamoto; Keizaburo Ohtaki, both of Sayama, Japan

[73] Assignee: Honda Giken Kogyo Kabushiki Kaisha, Tokyo, Japan

[21] Appl. No.: 790,037

[22] Filed: Nov. 12, 1991

[30] Foreign Application Priority Data

Nov. 28, 1990 [JP] Japan .................................. 2-326468

[51] Int. Cl.⁵ ............................................. B23P 21/00
[52] U.S. Cl. ...................................... 29/783; 29/784; 29/786; 29/787; 29/793; 29/795; 228/47
[58] Field of Search .................. 29/771, 783, 784, 786, 29/787, 793, 794, 795, 799, 822, 897.2, 429, 430, 462, 469; 228/47 A, DIG. 1

[56] References Cited

U.S. PATENT DOCUMENTS

| | | | |
|---|---|---|---|
| 4,404,451 | 9/1983 | Niikawa et al. | 228/47 A |
| 4,441,645 | 4/1984 | Takagishi et al. | 228/47 A |
| 4,448,341 | 5/1984 | Fujikawa et al. | 228/47 A |
| 4,611,380 | 9/1986 | Abe et al. | 29/430 |

Primary Examiner—Mark Rosenbaum
Assistant Examiner—David P. Bryant
Attorney, Agent, or Firm—Armstrong, Westerman, Hattori, McLeland & Naughton

[57] ABSTRACT

A working line for a rear floor of a vehicle includes a first setting station for setting the rear floor panel on the rear frame, a combining station for combining the rear floor panel to the rear frame, an assembling station for assembling the rear floor by welding the rear wheel housings and the rear panel to the rear floor panel, and a second setting station. They are arranged in the order mentioned from a starting end towards a finishing end of the working line. The working line further includes right and left first setting devices which are reciprocated between the second setting station and the assembling station for assembling the rear wheel housings which are set in said second setting station to the rear floor panel when the first setting jig is advanced to the assembling station, a second setting device which is provided within a space defined by the first setting devices and is reciprocated between the second station and the assembling station for assembling the rear panel which is set in the second setting station to the rear floor panel when the second setting means is advanced to the assembling station, and discharging means for discharging by hanging the assembled rear floor out of the assembling station.

3 Claims, 11 Drawing Sheets

WORKING LINE FOR REAR FLOOR OF VEHICLE

BACKGROUND OF THE INVENTION

This invention relates to a working line for a rear floor which constitutes a rear portion of a floor panel of a vehicle such as a motorcar or the like.

Figure 16:
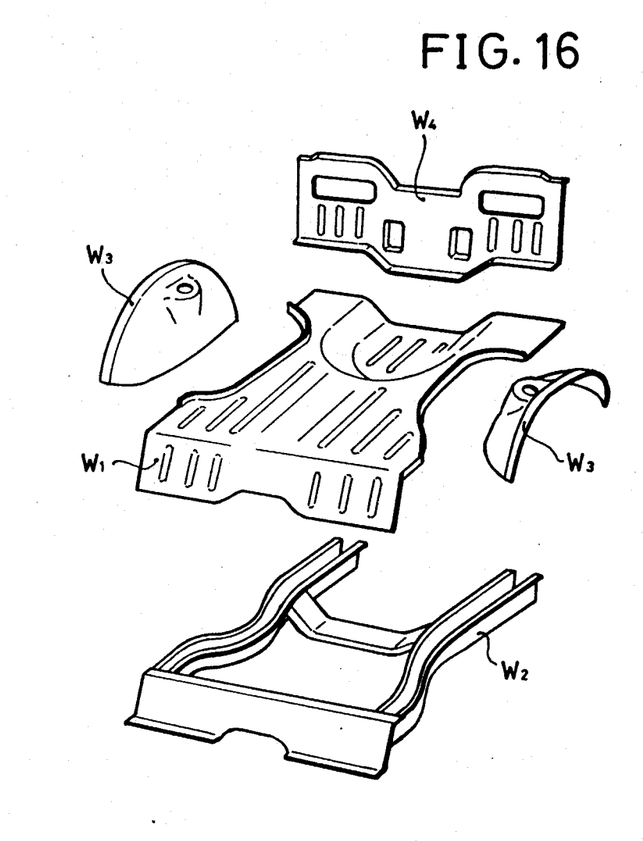
FIG. 16 is an exploded perspective view of a rear floor.

As shown in FIG. 16, the rear floor is assembled by combining a rear frame $W_2$ to a bottom surface of a rear floor panel $W_1$, rear wheel housings $W_3$ to both sides of the rear floor panel $W_1$, and a rear panel $W_4$ to an edge of the rear floor panel $W_1$.

A conventional working line for the rear floor comprises, as seen from a starting end towards a finishing end of the working line: a setting station for setting the rear floor panel on the rear frame; a combining station for combining the rear frame to the rear floor panel; a setting station for setting right and left rear wheel housings to the rear floor panel; a combining station for the rear wheel housings; a setting station for setting the rear panel to the rear floor panel; and a combining station for the rear panel. It is so arranged that the rear floor which has been assembled in the combining station for the rear panel is discharged towards a front direction of the combining station.

The reason why the setting stations for the rear wheel housings and the rear panel are provided independently of the combining stations for these members is that the setting work of these members is carried out in a place which is away from welding robots to be provided in the combining stations.

In the above-described conventional working line, there is a disadvantage in that the line length becomes long because the setting station and the combining station for the rear wheel housings as well as the setting station and the combining station for the rear panel are provided.

In order to shorten the working line length, it may be considered to set the rear wheel housings and the rear panel to the rear floor panel in the setting station next to the combining station for the rear frame, and then to combine the rear wheel housings and the rear panel to the rear floor panel in the following combining station. However, in such an arrangement, regardless of whether the rear floor panel is transported in a longitudinally or laterally oriented posture, either one of the rear panel and the rear wheel housings must be set in position by a worker's placing himself inside the setting station. As a matter of fact, since it is impossible to work inside the setting station, this idea is not practical.

OBJECT AND SUMMARY OF THE INVENTION

In view of the above disadvantage, this invention has an object of providing a working line for a rear floor in which the setting work of the rear wheel housings and the rear panel as well as the combining work of both members to the rear floor panel can be respectively carried out in a single station, thereby shortening the line length.

According to this invention, in order to attain the above-described object, there is provided a working line for a rear floor of a vehicle, the working line comprising: a first setting station for setting a rear floor panel on a rear frame; a combining station for combining the rear floor panel to the rear frame; an assembling station for assembling the rear floor by combining the rear wheel housings and the rear panel to the rear floor panel; and a second setting station. The first setting station through the second setting station are disposed in the order as described from a starting end towards a finishing end of the working line. The working line further comprises: a pair of right and left first setting means which are reciprocated between the second setting station and the assembling station, for assembling the rear wheel housings which are set in the second setting station to the rear floor panel when the first setting means are advanced to the assembling station; second setting means which is provided within a space defined by the first setting means and is reciprocated between the second setting station and the assembling station for assembling the rear panel which is set in the second setting station to the rear floor panel when the second setting means is advanced to the assembling station; and discharging means for discharging by hanging the assembled rear floor out of the assembling station.

In a condition in which the first and the second setting means are retreated to the second setting station, the rear wheel housings and the rear panel are set to each of the setting means. The rear wheel housings and the rear panel thus set in position are assembled, by each of the setting means, to the rear floor panel which is transported into the assembling station and are combined to the rear floor panel in the assembling station.

In this arrangement, since the second setting station is positioned in a rear stage of the assembling station, and the rear floor assembled in the assembling station is discharged by hanging out of the assembling station, the second setting station is always left open for the setting work. Therefore, the setting work of the rear wheel housings and the rear panel can be carried out in the second setting station without any problem or inconvenience.

BRIEF DESCRIPTION OF THE DRAWINGS

The above and other objects and the attendant advantages of this invention will become readily apparent by reference to the following detailed description when considered in conjunction with the accompanied drawings wherein.

DETAILED DESCRIPTION OF A PREFERRED EMBODIMENT

Figures 1, 2:
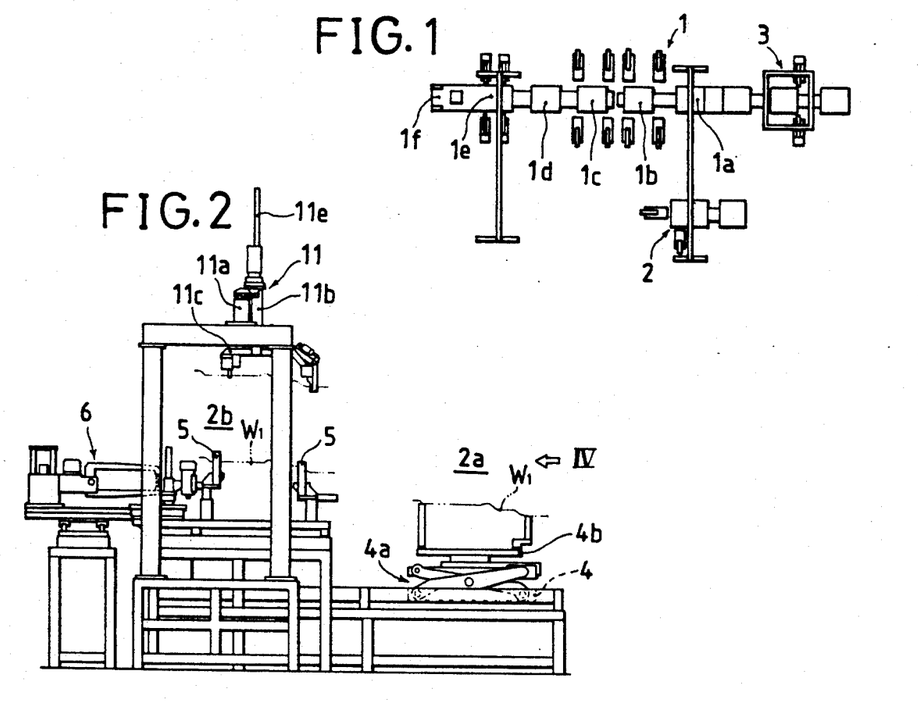
FIG. 1 is an overall plan view of a working line of this invention.
FIG. 2 is a side view of a rear floor panel assembling apparatus.

Referring to FIG. 1, numeral 1 denotes a working line for a rear floor W. On a side of a starting end of the working line 1, there is provided an assembling apparatus 2 for a rear floor panel $W_1$, and in a rear of the starting end of the working line 1 there is provided an assembling apparatus 3 for a rear frame $W_2$.

Figure 3:
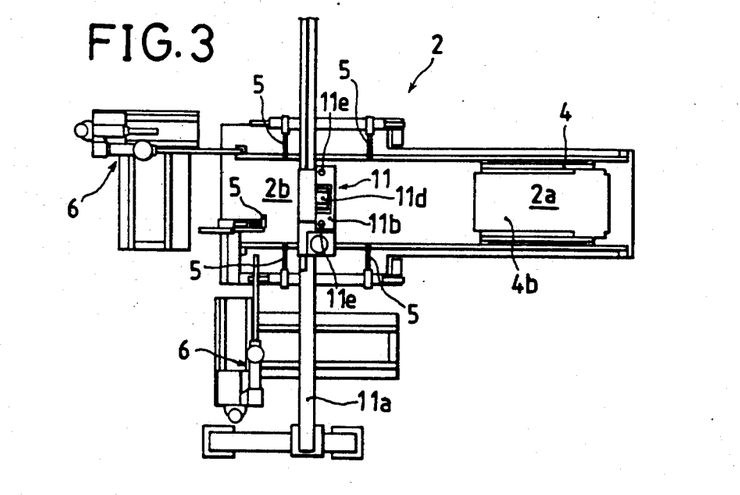
FIG. 3 is a plan view thereof.
Figure 4:
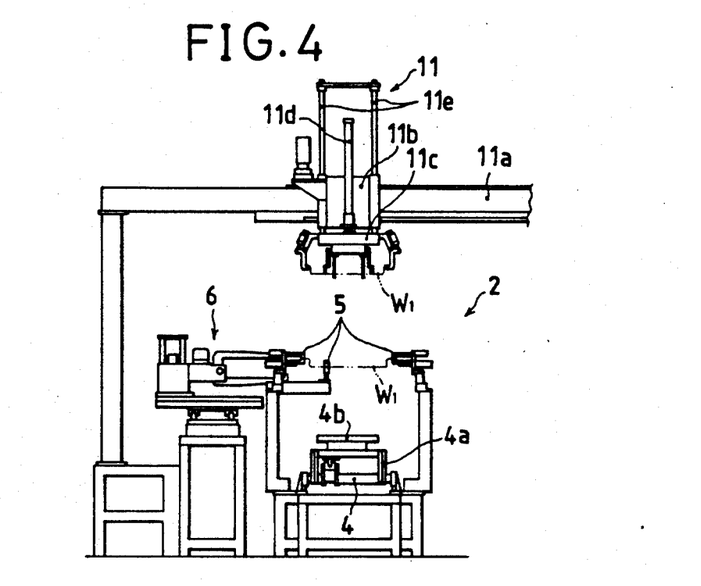
FIG. 4 is a front view viewed from the line IV—IV in FIG. 2.

The assembling apparatus 2 is provided, as shown in FIGS. 2 through 4 with: a setting cart 4 which can be reciprocated between a setting place 2a and an assembling place 2b which lies in front of the setting place 2a; a plurality of workpiece holding members 5 and welding robots 6, both of which are provided in the assembling place 2b. A setting jig 4b is mounted on the setting cart 4 via an X-shaped link mechanism 4a. In the setting place 2a, a panel main body and minor parts which constitute the rear floor panel $W_1$ are set in position on the setting jig 4b. Then, the setting jig 4b is lifted by the X-shaped link mechanism 4a and the setting cart 4 is advanced to the assembling place 2b to tack-weld the panel main body and the minor parts. Thereafter, the tack-welded rear floor panel $W_1$ is handed over to the workpiece holding members 5, and the setting jig 4b is lowered. The setting cart 4 is then retreated to the setting place 2a to set the next workpieces thereon. At the same time, the floor panel $W_1$ which is held by the workpiece holding members 5 is subjected to further reinforcing welding by the welding robots 6.

Figure 5:
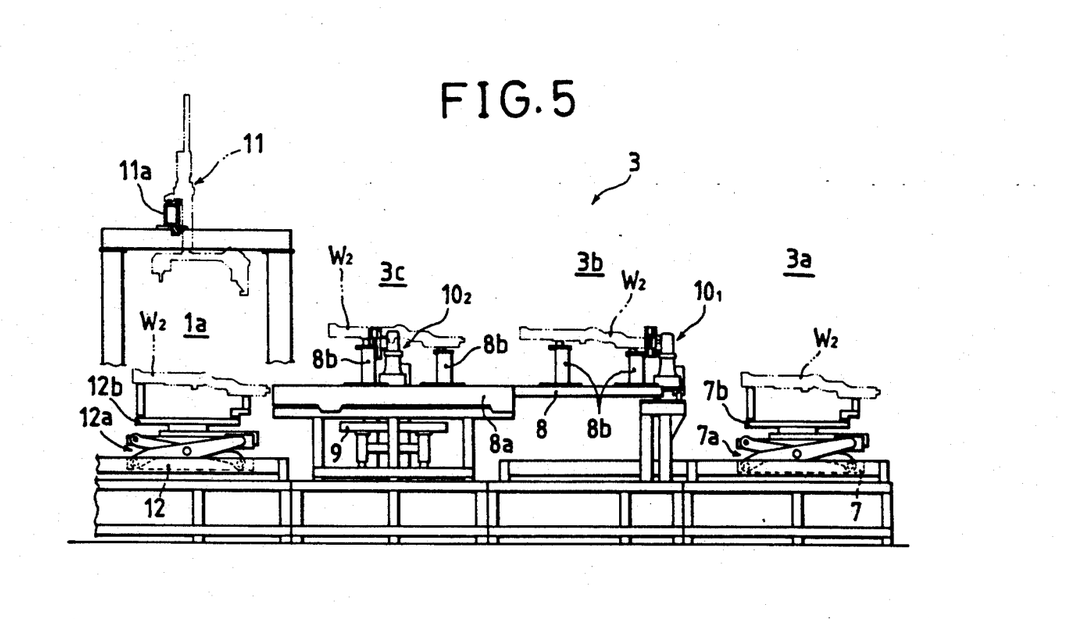
FIG. 5 is a side view of a rear frame assembling apparatus.
Figure 6:
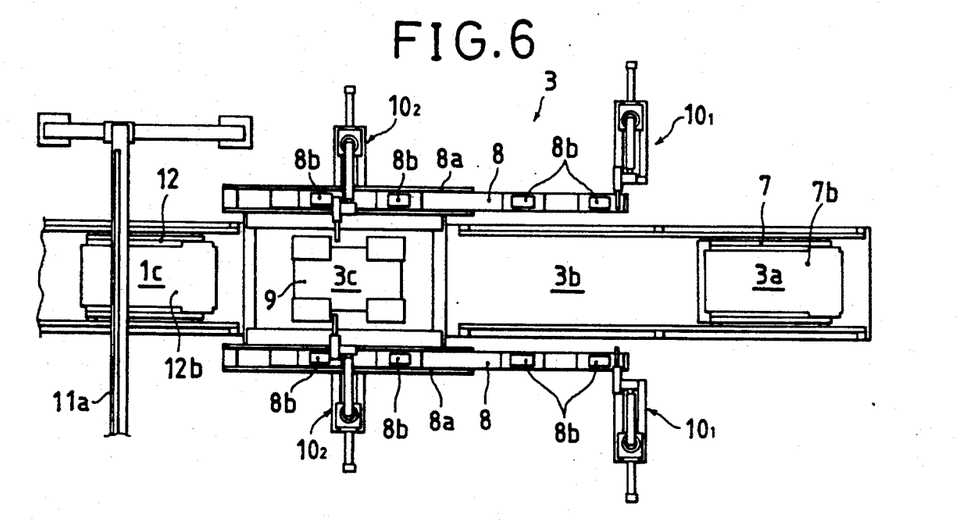
FIG. 6 is a plan view thereof.

The assembling apparatus 3 for the rear frame $W_2$ is provided, as shown in FIGS. 5 and 6 with: a setting cart 7 which can be reciprocated between a setting place 3a and an assembling place 3b which lies in front of the setting place 3a; a pair of transfer bars 8, 8 which can be moved back and forth along rail frames 8a, 8a which are provided on both sides of a reinforcing welding place 3c which is in front of the assembling place 3b; a jig 9 which is provided in the reinforcing welding place 3c so as to be movable up and down; and welding robots $10_1$, $10_2$ which are provided on both sides of the assembling place 3b and the reinforcing welding place 3c, respectively. A setting jig 7b is mounted on the setting cart 7 via an X-shaped link mechanism 7a. In the setting place 3a, the constituting members of the rear frame $W_2$ are set in position on the setting jig 7b. Then, the setting jig 7b is lifted by the X-shaped link mechanism 7a and the setting cart 7 is advanced to the assembling place 3b. In this condition, the rear frame $W_2$ is tack-welded by the welding robots $10_1$ and then the setting jig 7b is lowered to let workpiece receiving members 8b which are provided at a rear portion of the transfer bar 8 to receive the rear frame $W_2$. Then, the rear frame $W_2$ is transported to the reinforcing welding place 3c by the advancement of the transfer bars 8. The rear frame $W_2$ is received by the jig 9 by the lifting thereof and, in this condition, the rear frame $W_2$ is subjected to reinforcing welding by the welding robots $10_2$.

In front of the reinforcing welding place 3c, there is disposed a first setting station 1a which is positioned at a starting end of the working line 1. While the rear frame $W_2$ is being subjected to the reinforcing welding, the transfer bars 8 are retreated. When the jig 9 is lowered after the reinforcing welding has been finished, the rear frame $W_2$ is handed over to workpiece receiving members 8b which are provided at a front portion of the transfer bars 8, so that the rear frame $W_2$ can be discharged to the first setting station 1a in the next advancement of the transfer bars 8.

The rear floor panel $W_1$ which has been assembled in the assembling place 2b of the assembling apparatus 2 is transported from the assembling place 2b to the first setting station 1a by a hanging type of transfer means 11 and is set on the rear frame $W_2$ discharged to the first setting station 1a. The transfer means 11 comprises, as shown in FIG. 4, a travelling frame 11b which travels along a guide frame 11a provided in an upper space between the assembling place 2b and the first setting station 1a, and a jig 11c which holds the rear floor panel $W_1$ and is suspended from the travelling frame 11b by a cylinder 11d and guide bars 11e, 11e so as to be movable up and down. In the assembling place 2b, the jig 11c is lowered to let it receive the rear floor panel $W_1$ which is held by the workpiece holding members 5. Then, the jig 11c is lifted and the rear floor panel $W_1$ is transported to the first setting station 1a by the movement of the travelling frame 11b.

In the first setting station 1a a transport cart 12 is kept waiting. A jig 12b is mounted on the transport cart 12 via an X-shaped link mechanism 12a. The rear frame $W_2$ to be discharged by the transfer bars 8 into the first setting station 1a is received by the jig 12b by the lifting thereof. The rear floor panel $W_1$ transported by the transfer means 11 to the first setting station 1a is set in position, on the rear frame $W_2$ which has been set to the jig 12b, by the lowering of the jig 11c.

Figure 7:
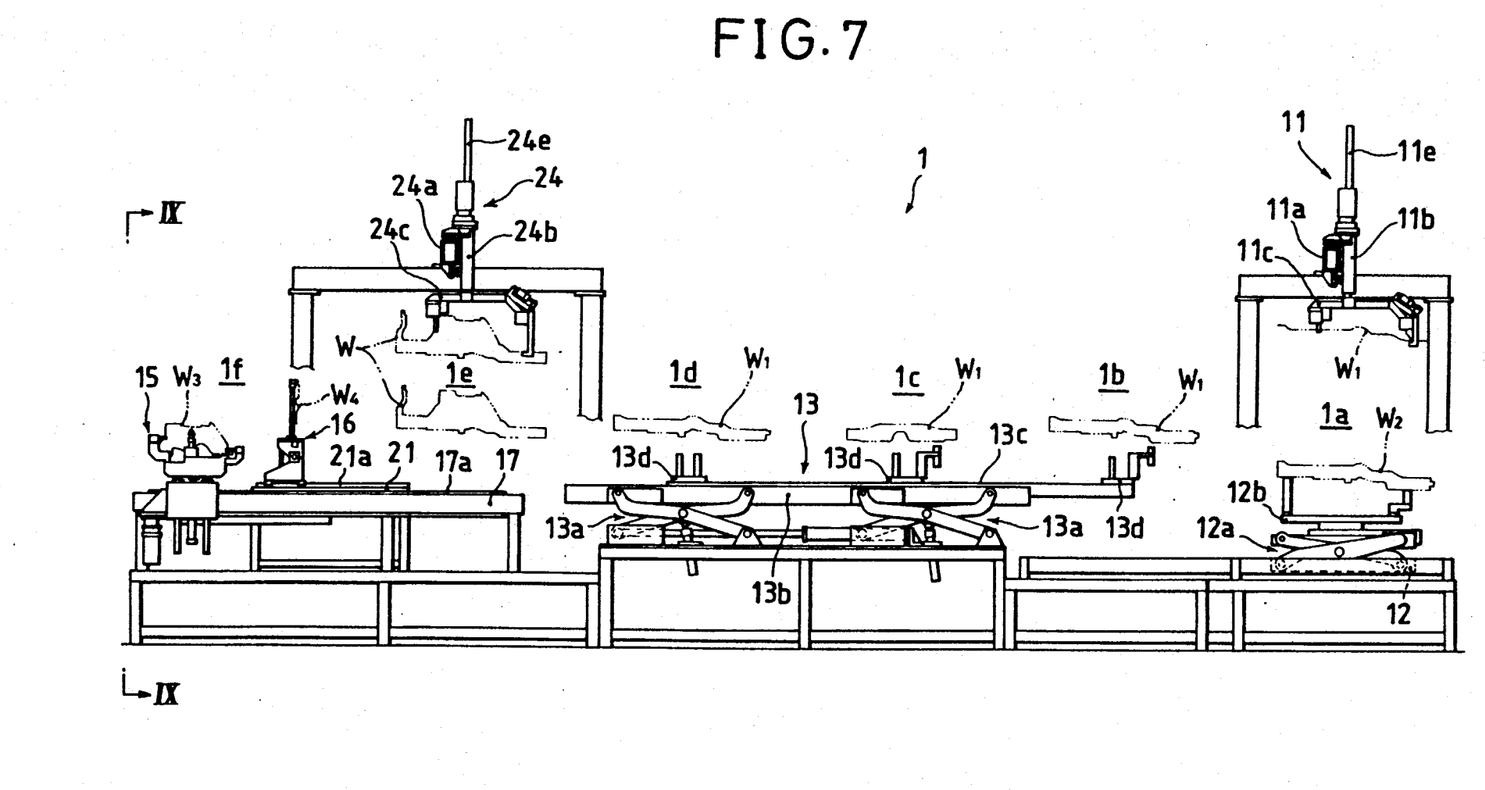
FIG. 7 is a side view of the working line.
Figure 8:
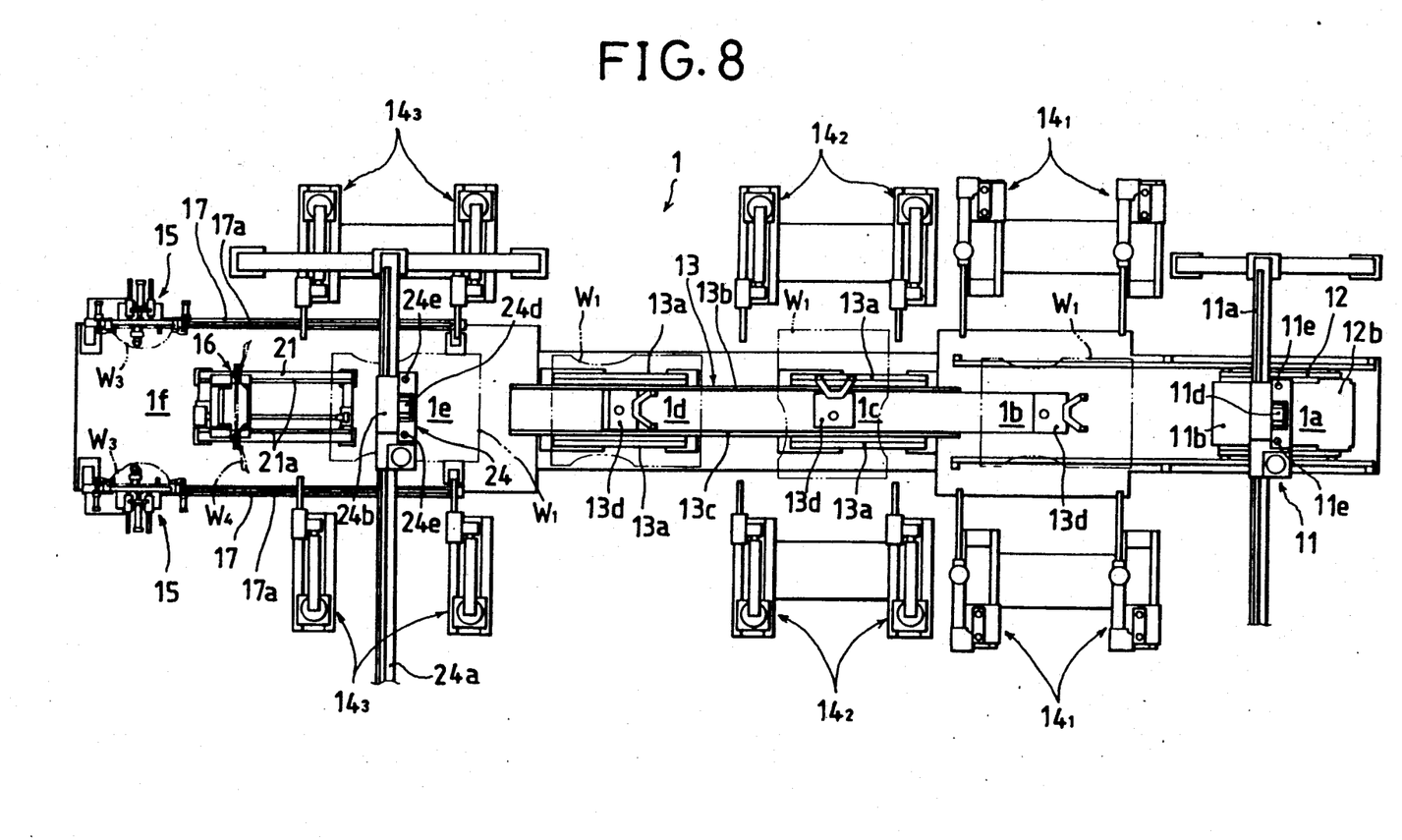
FIG. 8 is a plan view thereof.

In the working line 1 there are provided, as shown in FIGS. 7 and 8, from the starting end towards the finishing end, the first setting station 1a, a first and a second combining stations arranged in the front and the rear two stages, an idling station 1d, an assembling station 1e and a second setting station 1f in the order as described above. The transport cart 12 is arranged to be reciprocated between the first setting station 1a and the first combining station 1b. In addition, there is provided in the working line 1 a transfer apparatus 13 which intermittently transports the rear floor panel $W_1$ from the first combining station 1b to the assembling station 1e through the second combining station 1c and the idling station 1d.

The transfer apparatus 13 comprises a rail frame 13b which is moved up and down by X-shaped link mechanisms 13a, 13a and a transfer bar 13c which is supported on the rail frame 13b so as to be movable back and forth. Three pieces of workpiece receiving members 13d for receiving the rear floor panel $W_1$ are provided on the transfer bar 13c in a longitudinal direction at the same pitch as that of the stations. The rear end workpiece receiving member 13d and the intermediate workpiece receiving member 13d are respectively supported so as to be rotatable to a longitudinally oriented posture and a laterally oriented posture relative to the transfer bar 13c. It is thus so arranged that, at the time of advancement of the transfer bar 13c, the rear end workpiece receiving member 13d is converted from the longitudinally oriented posture to the laterally oriented posture and that the intermediate workpiece receiving member 13d is converted from the laterally oriented posture to the longitudinally oriented posture.

Though not shown, fixing jigs for supporting the rear floor panel $W_1$ are provided in the first and the second combining stations 1b, 1c, the idling station 1d and the assembling station 1e. By advancing the transport cart 12 to the first combining station 1b and lowering the jig 12b, the rear frame $W_2$ and the rear floor panel $W_1$ which have been set on the jig 12b in the first setting station 1a can be placed in one set on the fixing jigs in the first combining station 1b. In this condition, the rear frame $W_2$ is welded to the rear floor panel $W_1$ by welding robots $14_1$ which are disposed on both sides of the first combining station 1b. Then, the rail frame 13b of the transfer apparatus 13 is lifted to let the rear end workpiece receiving member 13d receive the rear floor panel $W_1$. The transfer bar 13c is then advanced and the rear floor panel $W_1$ is converted in posture from the longitudinally oriented posture to the laterally oriented posture by the conversion of the workpiece receiving member 13d to transport it to the second combining station 1c. Thereafter, the transfer bar 13c is lowered to place the rear floor panel $W_1$ in the laterally oriented posture on the fixing jigs in the second combining station 1c. In this condition, the remaining welding spots of the rear floor panel $W_1$ and the rear frame $W_2$ are welded by the welding robots $14_2$ which are disposed on both sides of the second combining station 1c. During this welding work, the transfer bar 13c is returned to the retreated position. After the welding work has been finished, the transfer bar 13c is lifted and is advanced again. According to this operation, the already worked rear floor panel $W_1$ in the second combining station 1c is converted in posture through the above-described conversion of the intermediate workpiece receiving member 13d from the laterally oriented posture to the longitudinally oriented posture while it is supported by the intermediate workpiece receiving member 13d on the transfer bar 13c, and is transported to the idling station 1d. Then, the transfer bar 13c is lowered to mount the rear floor panel $W_1$ on the fixing jigs in the idling station 1d in the longitudinally oriented posture. Thereafter, the transfer bar 13c is retreated and, at the time of lifting of the transfer bar 13c in the next tact feeding (i.e., intermittent longitudinal feeding), the rear floor panel $W_1$ is supported by the front end workpiece receiving member 13d and is transported to the assembling station 1e through the advancement of the transfer bar 13c. The rear floor panel $W_1$ is then mounted on the fixing jigs at the assembling station 1e by the lowering of the transfer bar 13c.

The right and the left rear wheel housings $W_3$, $W_3$ and the rear panel $W_4$ are assembled to the rear floor panel $W_1$ which has thus been transported to the assembling station 1e, by means of first setting means 15, 15 for the pair of right and left rear wheel housings and a second setting means 16 for the rear panel, both being provided so as to be reciprocatable between the assembling station 1e and the second setting station 1f in front thereof. The rear wheel housings $W_3$, $W_3$ and the rear panel $W_4$ are welded to the rear floor panel $W_1$ by welding robots $14_3$ which are disposed on both sides of the assembling station 1e, thereby completing the assembling of the rear floor W.

Figure 10:
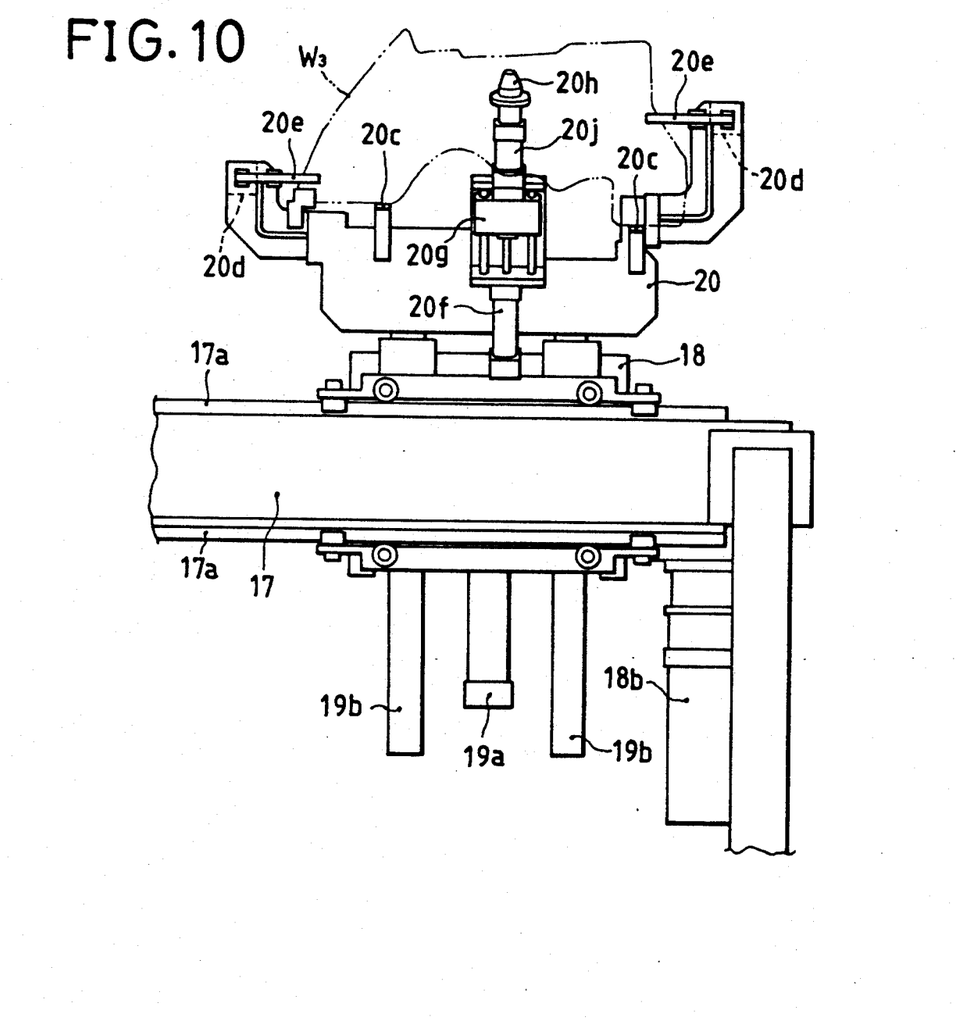
FIG. 10 is a side view of a first setting means viewed from the direction of an arrow X in FIG. 9.
Figure 11:
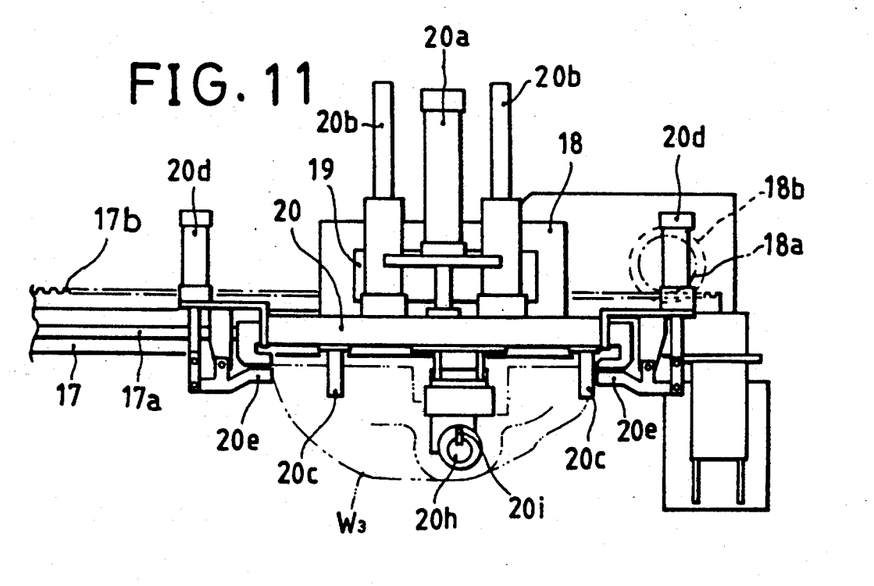
FIG. 11 is a plan view thereof.
Figure 12:
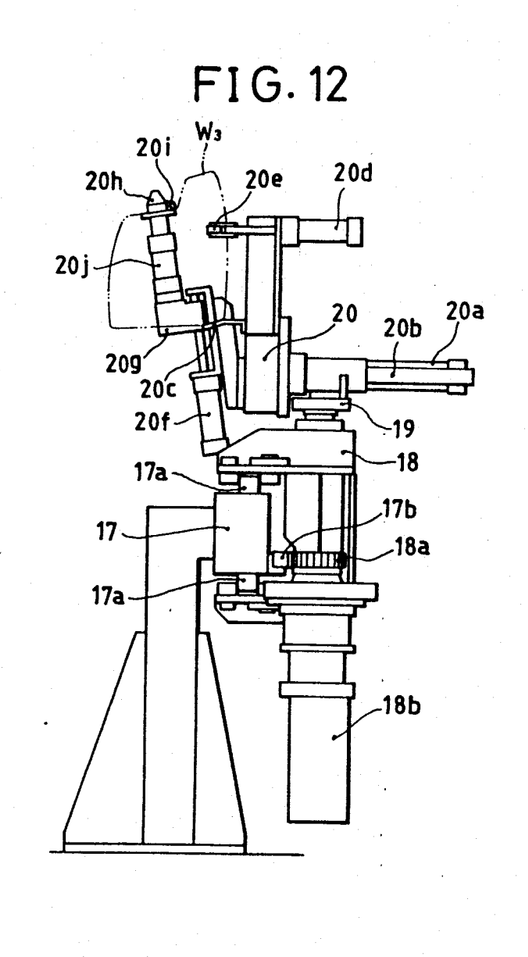
FIG. 12 is a right side view of FIG. 10.

Each of the above-described first setting means 15 comprises, as shown in FIGS. 10 through 12: a travelling frame 18 which is movable back and forth along rails 17a on a guide frame 17 which is provided between a side of the second setting station 1f and a side of the assembling station 1e; a lifting frame 19 which is mounted on the travelling frame 18 and is moved up and down by a cylinder 19a and guide bars 19b, 19b; and a setting jig 20 for holding the rear wheel housing $W_3$, the setting jig 20 being mounted on the lifting frame 19 so as to be movable back and forth in the laterally inward direction by a cylinder 20a and guide bars 20b, 20b.

There is provided on the travelling frame 18 an electric motor 18b which has, on an output shaft thereof, a pinion 18a to be engaged with a rack 17b fixed to the guide frame 17. The travelling frame 18 is reciprocated by the electric motor 18b between the assembling station 1e and the second setting station 1f. When the travelling frame 18 is retreated to the second setting station 1f, the rear wheel housing $W_3$ is set in position on the jig 20. When the travelling frame 18 is advanced to the assembling station 1e, the setting jig 20 is advanced laterally inwards by the cylinder 20a in a condition in which the height is adjusted by the lifting frame 19. The rear wheel housing $W_3$ is thus assembled in a predetermined positional relationship to a side of the rear frame $W_1$ which is positioned in the assembling station 18.

The setting jig 20 is provided with a plurality of workpiece receiving members 20c for receiving a lower edge of the rear wheel housing $W_3$, a plurality of clamping members 20e which can be opened and closed by cylinders 20d, and a positioning pin 20h which is fixed to a movable frame 20g which is moved up and down by a cylinder 20f so that it can be fitted from a lower side into a damper attaching hole which is provided in the rear wheel housing $W_3$. In a condition in which the rear wheel housings $W_3$ are assembled to the rear floor panel $W_1$, the rear wheel housings $W_3$ are tack-welded to the rear floor panel $W_1$ by the welding robots $14_3$ which are disposed on both sides of the assembling station 1e. Then, the clamping members 20e are unclamped and, at the same time, the positioning pins 20h are detached from the damper attaching holes to retreat the setting jig 20 laterally outwards. In this condition, reinforcing welding is carried out by the welding robots $14_3$ and, at the same time, the travelling frame 18 is retreated to the second setting station 1f to make preparations for the next setting work of the workpieces. The above-described positioning pin 20h has incorporated therein a clamping piece 20i for clamping an edge portion of the damper attaching hole. In the drawings, numeral 20j denotes a cylinder for operating the clamping piece 20i.

Figure 13:
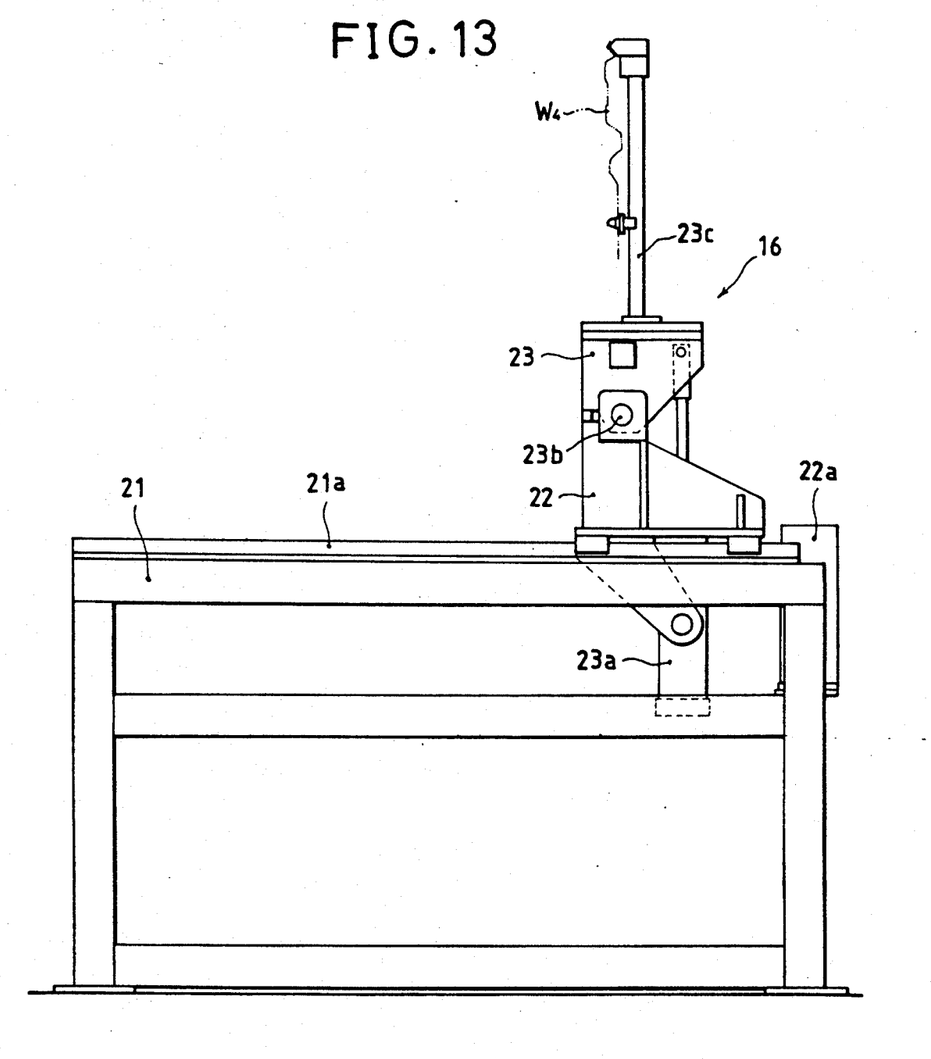
FIG. 13 is a side view of a second setting means viewed from the direction of an arrow XIII in FIG. 9.
Figure 14:
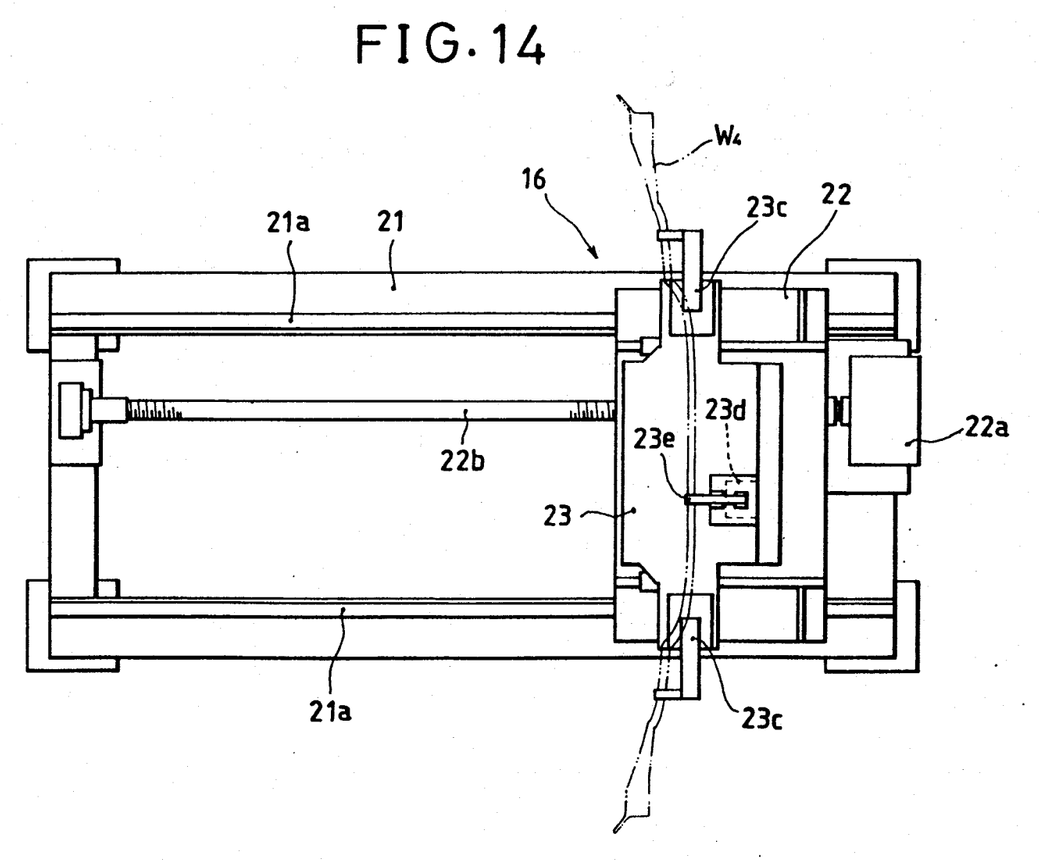
FIG. 14 is a plan view thereof.
Figure 15:
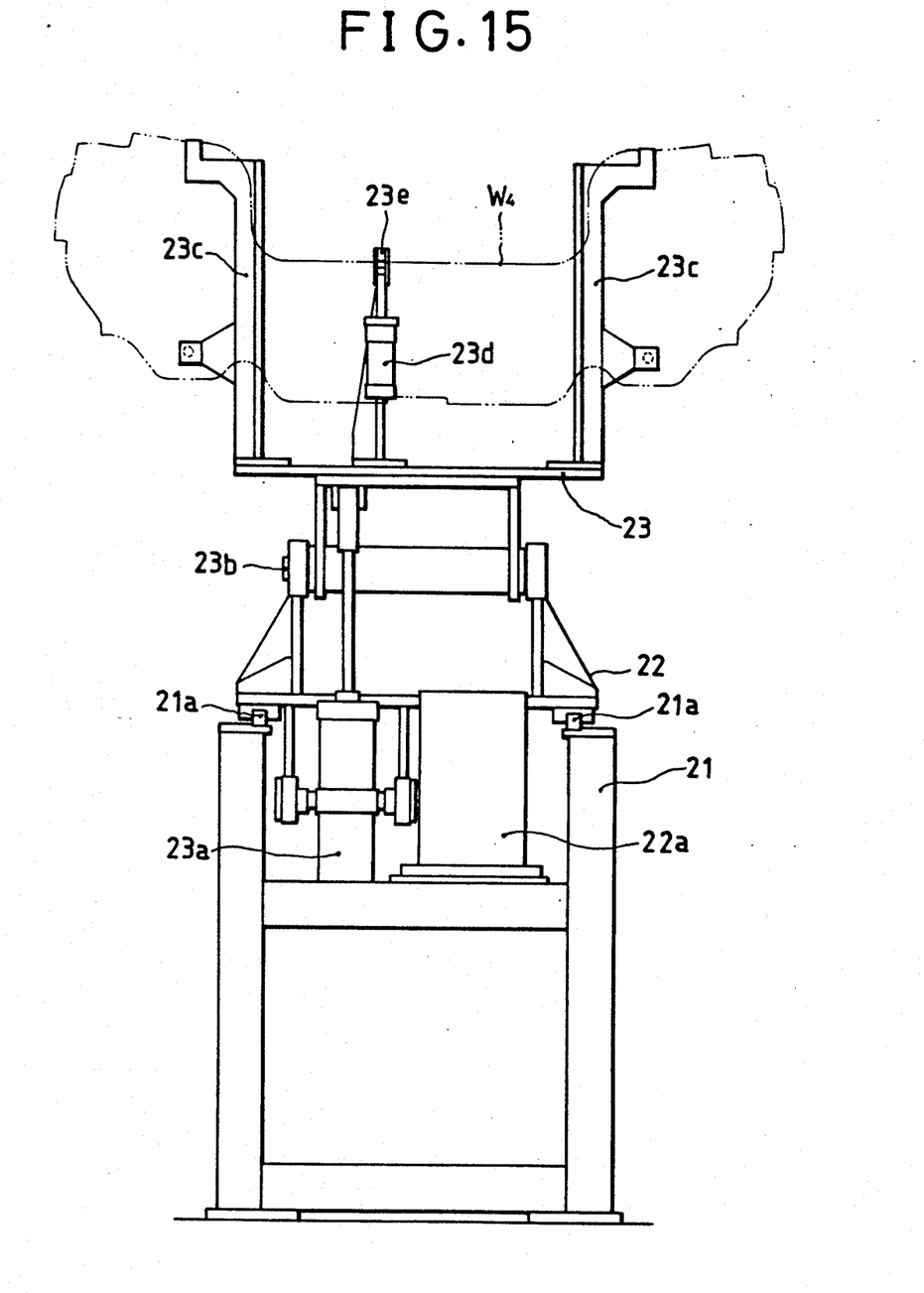
FIG. 15 is a right side view of FIG. 13.

The second setting means 16 comprises, as shown in FIGS. 13 through 15: a travelling frame 22 which moves back and forth along guide rails 21a, 21a on a base frame 21 which is disposed between the second setting station 1f and the assembling station 1e within a space defined by both of the first setting means 15, 15; and a setting jig 23 which is mounted on the travelling frame 22 for holding the rear panel $W_4$ and is arranged so as to be erected and laid down by a cylinder 23a about an axis 23b located at a lower end of the setting jig 23. The setting jig 23 is provided with a pair of supporting bars 23c, 23c for supporting both side portions of the rear panel $W_4$ and a clamping piece 23e which is operated by a cylinder 23d for clamping an intermediate portion of the rear panel $W_4$. The travelling frame 22 is moved back and forth between the assembling station 1e and the second setting station 1f by an electric motor 22a mounted on the base frame 21 through a ball thread mechanism 22b. When the travelling frame 22 is retreated to the second setting station 1f, the setting jig 23 is laid down to set the rear panel $W_4$ on the pair of the supporting bars 23c, 23c, and clamp it with the clamping piece 23e. When the travelling frame 22 is advanced to the assembling station 1e, the setting jig 23 is erected to assemble the rear panel $W_4$ to an edge of the rear floor panel $W_1$. After tack-welding the rear panel $W_4$ to the rear floor panel $W_1$ with the welding robots $14_3$, the clamping piece 23e is unclamped, and the travelling frame 22 is retreated to the second setting station 1f. At the same time, reinforcing welding is carried out by the welding robots 14₃.

As described above, the rear wheel housings W₃ and the rear panel W₄ which have been set in position to the first and the second setting means 15, 16, respectively, in the second setting station 1f are assembled to the rear floor panel W₁ which is positioned in the assembling station 1e by each of the setting means 15, 16. They are then welded to the rear floor panel W₁ by the welding robots 14₃, thereby completing the assembling work of the rear floor W.

Figure 9:
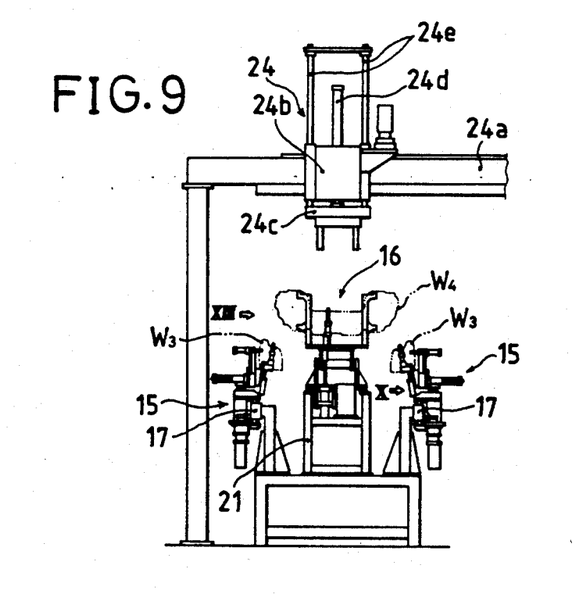
FIG. 9 is a front view of a second setting station viewed from the line IX—IX in FIG. 7.

The assembled rear floor W is suspended by a discharging means 24 and is discharged out of the assembling station 1e. In more detail, the discharging means 24 comprises, as shown in FIG. 9, a travelling frame 24b which travels along a guide frame 24a which extends sideways from an upper position of the assembling station 1e, and a jig 24c which is suspended from the travelling frame 24b for holding the rear floor W and is arranged to be movable up and down by a cylinder 24d and guide bars 24e, 24e. The rear floor W which is held by the fixing jig in the assembling station 1e is received by the jig 24c by the lowering thereof. Then, the jig 24c is lifted to suspend the rear floor W and, in this condition, the travelling frame 24b is moved to discharge the rear floor W towards a side of the assembling station 1e.

As is apparent from the foregoing description, according to this invention, there is provided, at a finishing end of the working line, the second setting station which is independent of the workpiece transporting path of the working line. The second setting station is used as a common setting station for the rear wheel housings and the rear panel to set the rear wheel housings and the rear panel to each of the setting means in the setting station. In the assembling station which is disposed on an upstream side of the second setting station, the rear wheel housings and the rear panel are assembled to the rear floor panel by each of the setting means. The setting station and the combining station for the rear wheel housings and the rear panel are constituted respectively by a single common station. Therefore, there is an advantage in that the working line length can be shortened without impairing the workability.

It is readily apparent that the above-described working line has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A working line for a rear floor of a vehicle for assembling the rear floor by combining a rear frame, rear wheel housings and a rear panel to a rear floor panel, said working line comprising:
    a first setting station for setting the rear floor panel on the rear frame;
    a combining station for combining the rear floor panel to the rear frame;
    an assembling station for assembling the rear floor by combining the rear wheel housings and the rear panel to the combined rear floor panel and rear frame;
    a second setting station, said first setting station through said second setting station being disposed in the order described above from a starting end towards a finishing end of said working line;
    right and left first setting means, which are reciprocated between said second setting station and said assembling station for assembling the rear wheel housings, which are preliminarily set to said right and left setting means in said second setting station to the rear floor panel when said first setting means are advanced to said assembling station;
    second setting means which is provided within a space defined by said right and left first setting means and is reciprocated between said second setting station and said assembling station, for assembling the rear panel, which is preliminarily set to said second setting means in said second setting station, to the rear floor panel when said second setting means is advanced to said assembling station; and
    discharging means for hanging the assembled rear floor and passing it out of said assembling station.

2. A working line for a rear floor of a vehicle according to claim 1, wherein each of said first setting means comprises: a travelling frame which is reciprocated between a side of said assembling station and a side of said second setting station; a lifting frame which is provided on said travelling frame so as to be movable up and down; and a setting jig which holds the rear wheel housing and is provided on said lifting frame so as to be movable back and forth in a laterally inward direction.

3. A working line for a rear floor of a vehicle according to claim 1 or 2, wherein said second setting means comprises a travelling frame which is reciprocated between said assembling station and said second setting station; and a setting jig which holds the rear panel and is provided on said travelling frame so as to be erected and laid down.

* * * * *

UNITED STATES PATENT AND TRADEMARK OFFICE
CERTIFICATE OF CORRECTION

PATENT NO. : 5,191,707
DATED : March 9, 1993
INVENTOR(S) : Hiroshi SASAMOTO et al.

It is certified that error appears in the above-identified patent and that said Letters Patent is hereby corrected as shown below:

In claim 1, Column 8, line 22, after "station", insert --,--.

In claim 1, Column 8, line 23, after "housing", delete ",".

Signed and Sealed this

First Day of March, 1994

Attest:

BRUCE LEHMAN

Attesting Officer     Commissioner of Patents and Trademarks